US011443048B2

(12) United States Patent
Cooke et al.

(10) Patent No.: US 11,443,048 B2
(45) Date of Patent: Sep. 13, 2022

(54) INSTALL-TIME PROCEDURAL CONTENT GENERATION FOR ENCRYPTED PACKAGES

(71) Applicant: Microsoft Technology Licensing, LLC, Redmond, WA (US)

(72) Inventors: Simon Lee Cooke, Redmond Town, WA (US); Xin Huang, Studio A, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 568 days.

(21) Appl. No.: 16/404,617

(22) Filed: May 6, 2019

(65) Prior Publication Data
US 2020/0356679 A1    Nov. 12, 2020

(51) Int. Cl.
*G06F 21/60* (2013.01)
*A63F 13/70* (2014.01)
*H04L 9/32* (2006.01)

(52) U.S. Cl.
CPC ............ *G06F 21/602* (2013.01); *A63F 13/70* (2014.09); *H04L 9/3236* (2013.01)

(58) Field of Classification Search
CPC combination set(s) only.
See application file for complete search history.

(56) References Cited

U.S. PATENT DOCUMENTS

| 6,892,306 B1 * | 5/2005 | En-Seung | G06F 21/10 713/160 |
| 8,327,449 B2 * | 12/2012 | Takashima | G11B 20/00086 380/239 |
| 8,368,686 B2 * | 2/2013 | Sommers | G06T 17/05 345/419 |
| 8,718,279 B2 * | 5/2014 | Rose | H04L 63/0428 380/44 |

(Continued)

FOREIGN PATENT DOCUMENTS

| EP | 1376301 A2 | 1/2004 |
| WO | 2013048418 A1 | 4/2013 |

OTHER PUBLICATIONS

Angelides et al., Procedural Content Generation, 2014, Wiley-IEEE Press, Edition: 1, pp. 62-91 (Year: 2014).*

(Continued)

*Primary Examiner* — Khang Do
(74) *Attorney, Agent, or Firm* — Ray Quinney & Nebeker P.C.; John O. Carpenter

(57) ABSTRACT

A system and method for generating content for an encrypted package is provided. A package may be received that includes one or more anti-tamper hash portions and encrypted data, where the encrypted data includes one or more procedural content generation instructions. A portion of the encrypted data including the one or more procedural content generation instructions may be decrypted and a data based on the execution of the one or more procedural content generation instructions and a corpus of data may be gener- (Continued)

ated. The generated data may be encrypted and anti-tamper hashes may be generated based on the encrypted generated data. The generated anti-tamper hashes may be compared to the one or more anti-tamper hashes in the anti-tamper hash portion of the received package.

20 Claims, 12 Drawing Sheets

(56) References Cited

U.S. PATENT DOCUMENTS

| | | | | |
|---|---|---|---|---|
| 2003/0076955 A1* | 4/2003 | Alve | ................ | G11B 20/00666 |
| | | | | 705/57 |
| 2004/0009815 A1* | 1/2004 | Zotto | ...................... | A63F 13/12 |
| | | | | 463/42 |
| 2004/0225890 A1* | 11/2004 | Kang | .................. | H04L 63/0428 |
| | | | | 713/193 |
| 2006/0150256 A1* | 7/2006 | Fanton | .................... | G06F 21/44 |
| | | | | 726/27 |
| 2007/0220261 A1* | 9/2007 | Farrugia | ............. | G06F 16/2255 |
| | | | | 713/176 |
| 2008/0301466 A1* | 12/2008 | Hsu | .......................... | G06F 8/65 |
| | | | | 713/189 |
| 2009/0205051 A1* | 8/2009 | Spinelli | .................. | G06Q 20/00 |
| | | | | 726/26 |
| 2012/0255027 A1* | 10/2012 | Kanakapura | ........ | H04L 63/1441 |
| | | | | 726/26 |
| 2016/0021132 A1* | 1/2016 | Sheppard | ................ | H04L 67/42 |
| | | | | 726/23 |
| 2017/0295144 A1* | 10/2017 | Song | .................. | H04L 63/0428 |

OTHER PUBLICATIONS

"International Search Report and Written Opinion Issued in PCT Application No. PCT/US2020/026173", dated Jun. 25, 2020, 13 Pages.

* cited by examiner

INSTALL-TIME PROCEDURAL CONTENT GENERATION FOR ENCRYPTED PACKAGES

BACKGROUND

Games and/or game application assets, such as graphics and audio, can be large in size which generally leads to considerable costs for network transfers and egress. For example, a game distributed via a network, such as the internet, may be on the order of several gigabytes to tens of gigabytes and may require a large amount of time and bandwidth to download. Thus, reducing the size of the games, application assets, and other forms of data such as video and audio streams is desirable to reduce the amount of data needed to be transferred over a network. Moreover, by reducing a size associated with the game and/or application assets that is to be downloaded, the reliability of the downloaded information increases, as there are fewer opportunities for data to be lost, corrupted, or otherwise rendered unusable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods that generate content for an encrypted package. For example, a package, such as a game or title, for installation at a gaming console or other device may be received at the gaming console or other device; the package may include one or more anti-tamper hash portions and encrypted data, where the encrypted data includes static content but lacks all content needed to successfully run the game at the gaming console or device. The package may also include one or more sets of procedural content generation instructions detailing how to generate the missing content alongside a smaller corpus of data to generate the content needed for installation at install-time. Accordingly, one or more procedural content generation instructions may be decrypted and data based on the execution of the one or more procedural content generation instructions may be generated. The generated data may be encrypted and anti-tamper hashes may be generated based on the encrypted generated data. The generated anti-tamper hashes may be compared to the one or more anti-tamper hashes in the anti-tamper hash portion of the received package. Accordingly, if the anti-tamper hashes match, the installation package is correct, uncorrupted, or otherwise complete. If, the anti-tamper hashes do not match, the gaming console or other device may download one or more of the generated data or entire installation package containing the generated data from another device, such as a content provider's server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
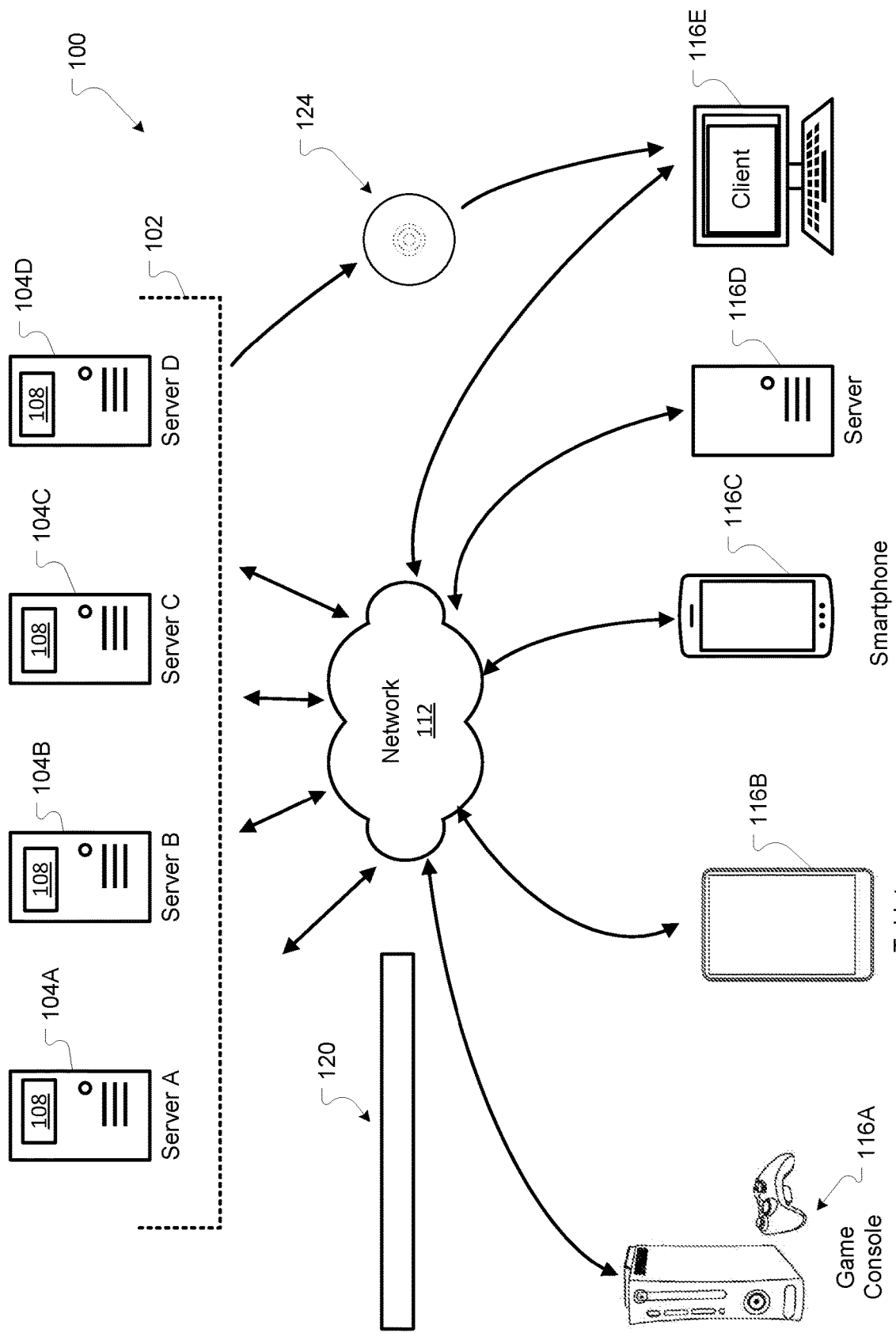
FIG. 1 illustrates details of a content update management system in accordance with the aspects of the disclosure.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Games and/or game application assets, such as but not limited graphics and audio, can be large in size which generally leads to considerable costs for network transfers and egress. In accordance with examples of the present disclosure, games and/or game application assets may be computed at install-time from a set of source data (compressed, "seed" data, or via machine learning methods) and can reduce an amount of data to be downloaded. That is, since the downloaded data is utilized to generate additional content associated with the game and/or game application assets, the data needing to be downloaded is smaller, as the downloaded data does not contain the content to be generated post download. In accordance with examples of the present disclosure, the content generation process is performed during installation because games and/or game application assets in compressed form are typically inefficient to operate upon at runtime, and require more computational resources than are typically allotted in a gaming environment. Generating these typically larger in size "conditioned" application assets for runtime use at install-time is not typically possible in environments where the data is encrypted-at-rest and resides at a storage location, as the encrypted data cannot be easily modified in a trusted and verifiable fashion.

In accordance with examples of the present disclosure, software packages, applications, games, and/or titles, may run in a content generation mode and generate their assets from original "compressed" or "seed" forms included in the downloaded data; accordingly, the generated assets may be written back to the game, or title, package in an encrypted form, and the original seed assets may be deleted if desired. Accordingly, not only do examples of the present disclosure reduce an amount of data that may need to be transferred and/or downloaded, but by deleting the original seed assets, additional storage space may be made available.

The final game, or title, files may then be verified against a "gold-standard" master version of the installation package. The "gold-standard" master version may include, but is not limited to an ideal form of the package on disk, which includes integrity and validation hashes for the generated data. Thus, validation hashes, such as anti-tamper hashes, ensure that the procedural content generation process was not tampered with, and that the files are of the form as expected.

In the event that the files are unexpectedly modified, or generation of the files from the seed data fails unpredictably, a hash validation check may fail and the "gold-standard" file data can be downloaded from a content provider, as if it was a regular encrypted file download. This ensures that the process is robust, and provides a measure of protection against unexpected or indeterministic results.

Accordingly, and in some examples, two or more file packages consisting of a series of concatenated files laid out as a single binary image, with header and metadata detailing the filename information, metadata for each file, location within the image, and whether or not the file acts as "seed" data or "final" data are provided. Each package may also contain integrity validation hash trees, such as but not limited to hash arrays, Merkle trees, hash chains, and/or hash lists, which may map to each block of data within the package file's data and allow the file data to be verified as containing the expected, known set of data. A first software package may be referred to as a Pre-Procedural Content Generation (Pre-PCG) package while the second software package may be referred to as the Post-Procedural Content Generation (Post-PCG) package, which when validated, may be the same as or similar to a "gold-standard" master version. One or more of the Pre-PCG package may include data and instructions needed to procedurally generate content at installation time. In some examples, one or more Pre-PCG packages may be utilized to provide, i.e., generate, the data for the game and/or application assets. The Post-PCG package may contain all of the data and any executable files needed to procedurally generate content, as well as the final expected output files of the content generation process.

Thus, at installation time, after the procedurally generated content source material has been installed, an application, script, or otherwise contained in the Pre-PCG package may be ran in a content generation mode. The content generation mode includes the ability to read decrypted files from the Pre-PCG package, and write out one or more resulting files to the installation package. Such files may be then validated against the integrity hash tree before use. Accordingly, in the event that the integrity hash tree validation fails for any written file, that file can be downloaded from the "gold-standard" package from a content provider. Thus, a last-ditch attempt may be made to recover the data so that it can be used securely, safely, and with assured integrity.

As such, the content generation application, script, or otherwise in the package, may include, but is not limited to: reading existing files containing instructions and/or seed data; generating new files from the instructions and/or seed data; providing to a storage location in a specific format, the generated content; transcoding the output data into a format that is optimized for use on a GPU or that otherwise targets specific hardware configurations and capabilities; and after the file has been output and finalized, validating the file against the hash tree. If a hash mismatch occurs, the generated file may deleted and replaced with a known-good version from the "gold-standard" package.

In some examples, the content generation process may vary depending on the target system it is applied to. For example, it may be desirable to have multiple "gold-standard" packages for different target hardware architectures. That is, for each of different target hardware architecture, the output data may vary significantly. As different sets of "gold-standard" reference packages may be generated for each architecture, the generated files may still be verified and validated. In some examples, implementations may use similar mechanisms within a package, or across packages. Thus, each target combination of attributes for a given installation may need a known "gold-standard" reference package.

The content-generation operation may be performed as, but not limited to: a background process while the application is running; a special background process while the operating system and other applications are running; and/or the only foreground process as part of the installation. The procedural content generation process may include, but is not limited to: one or more compression/decompression codecs applied to the data; recompression of generated data into a specific form targeted to specific hardware configurations and capabilities (for example: providing data in texture formats that target a specific GPU version); use of machine learning methods to generate data from compressed/unique forms, large-corpus methods for compressing, transmitting or distributing data, or other mechanisms (for example, generation of speech from a markup language, and then applying fixups to customize the output to match an actor's voice, the result being smaller than typical audio compression methods).

In accordance with examples of the present disclosure, by generating a package containing procedurally generated content and then generating anti-tamper hashes based on the package including the procedurally generated content, the procedurally generated content can be removed for transmission. Accordingly, the transmitted package is considerably smaller than the package that includes the procedurally generated content. In addition, the once the procedurally generated content is "generated," the anti-tamper hashes may be used to verify the integrity and the authenticity of the "generated" content. Accordingly, at least one technical benefit may include a smaller installation package being transmitted over a communication network. In some examples, at least one technical benefit may include adjusting one or more procedures based on an intended target hardware as previously discussed. Further, at least one technical benefit may include generating content for an encrypted filed in a secure manner.

FIG. 1 depicts a system directed to the installation of distributed encrypted content for procedural content generation at install-time for one or more systems in accordance with examples of the present disclosure. More specifically, a content distribution management system 100, may be provided as illustrated in FIG. 1. The content distribution management system 100 may generally include one or more content providers 102; the content providers 102 may include one or more servers 104A-104D. Each of the servers 104A-104D may include a content generator 108 configured to generate a game, title, and/or application asset content package to be installed at a target system. Alternatively, or in addition, the game, title, and/or application asset content package may be generated externally to the content distribution management system 100, by software developers for example, and provided to a target system. In some examples, the content generator 108 may receive static content files and procedurally generated content files, and may generate a Pre-Procedural Content Generation (Pre-PCG) package for the game, title, and/or game application asset and provide the Pre-PCG package to a system, or client device, for installation.

In accordance with examples of the present disclosure, a Pre-PCG package 120 may be transmitted via the network 112 to one or more endpoints, also referred to as a user device and/or a client devices 116. One or more client devices 116A-116E may receive the Pre-PCG package 120 for installation. In some examples, the client device 116A-116E may correspond to a game console 116A, a client device 116B, a smartphone 116C and/or a tablet 116E. In some instances, the endpoint may correspond to a server 116D; the server 116D may run a session or otherwise have a need for installing the Pre-PCG package 120. As another non-limiting example, at least one client device 116A-116E may be any device configured to allow a user to use an application such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other Internet of Things (IOT) devices.

Figure 2:
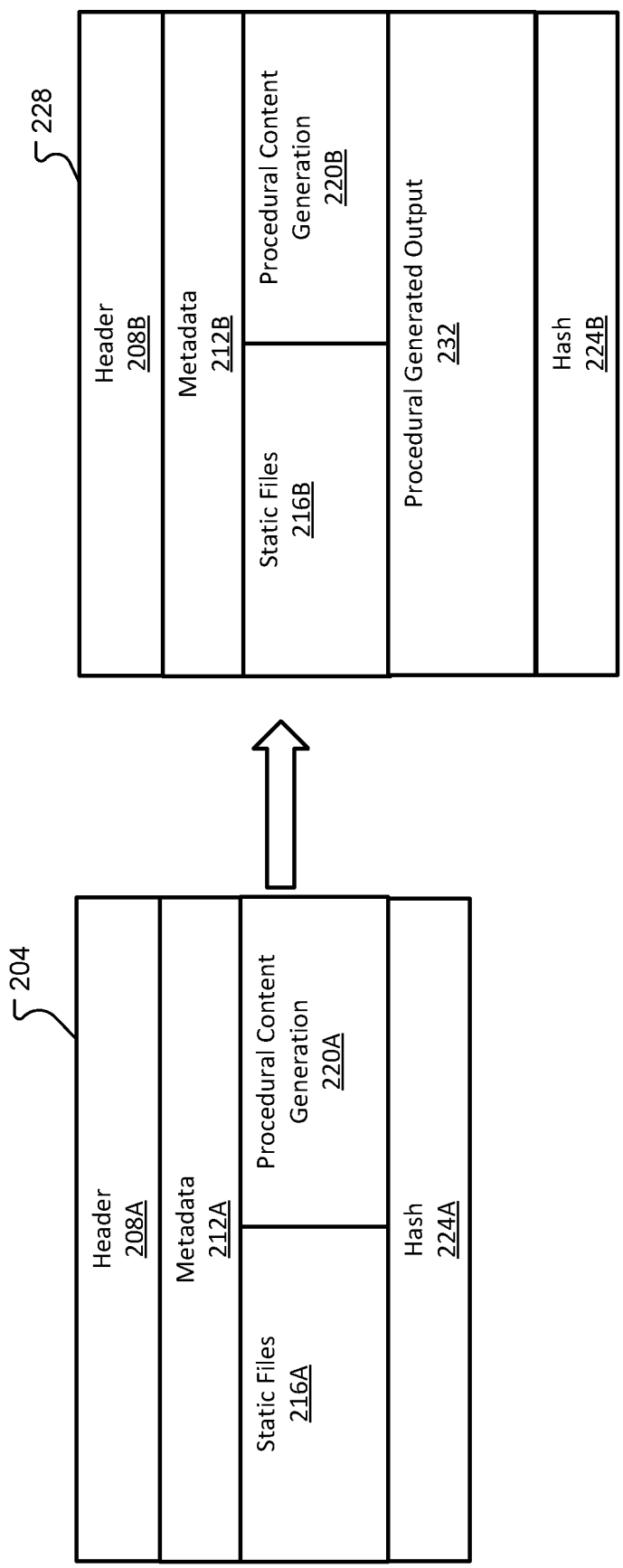
FIG. 2 depicts details of Pre and Post-Procedural Content Generation packages, files, and/or images in accordance with examples of the present disclosure.

FIG. 2 depicts additional details of a Pre-Procedural Content Generation (Pre-PCG) package 204 for a game, or title, in accordance with examples of the present disclosure. The Pre-PCG package 204 may correspond to or otherwise be in the form of an image, such as an image file. That is, a package may be distributed and/or stored in the form of a computer file containing the contents and the structure of a disk volume, where the disk volume, or logical construct, is generally a single accessible storage area with a single file system. The Pre-PCG package 204 may include, but is not limited to, a header portion 208A, a metadata portion 212A, a static file portion 216A, a procedural content generation portion 220A, and a hash portion 224A. The header portion 208A may include information generally describing the Pre-PCG package 204. For example, the header portion 208A may include, but is not limited to the date the file was Pre-PCG package 204 was created, the date the Pre-PCG package 204 was last updated, the size of the Pre-PCG package 204, and/or root hash information for the Pre-PCG package 204. The header portion 208A may be accessed by one or more of the content providers 102 and/or the client devices 116A-116E. The metadata portion 212A may include information describing contents of the Pre-PCG package 204. For example, the metadata portion 212A may include, but is not limited to, file directory listing information, a description of a file system, a file system, a file system corresponding to an image file, a file location information, data location information, and/or block location information. The static file portion 216A generally includes static files and/or other content that generally is not dependent upon a device in which the Pre-PCG package 204 is located and/or installed. As one non-limiting example, the static file portion 216A may include files that are required for Pre-PCG package 204 installation and/or other application asset content. The procedural content generation portion 220A includes instructions and seed data that provides for procedurally generated content, such as application asset content. For example, the procedural content generation portion 220A may include instructions, which when executed, generate additional content, such as but not limited to textures, graphic content, and audio content, level data etc. The hash portion 224A generally includes anti-tamper hashes that covers all files and data portions in the Pre-PCG package 204, whether distributed with the Pre-PCG package 204 or generated via the procedural content generation portion 220A. Anti-tamper hashes may be generated using one or more hash functions that are used to map data of arbitrary size to data of fixed size. The values returned by a hash function are referred to as hash values, hash codes, hash sums, or simply hashes. Thus, the anti-tamper hash functions allows one to easily verify whether some input data map to a given hash value. An example of a hash function is SHA-2.

In accordance with examples of the present disclosure, FIG. 2 depicts a Post-Procedural Content Generation (Post-PCG) package 228 which is similar to the Pre-Procedural Content Generation package 204. The Post-PCG package 228 may include, but is not limited to, a header portion 208B which may be the same as or similar to the header portion 208A, a metadata portion 212B which may be the same as or similar to the metadata portion 212A, a static file portion 216B which may be same as or similar to the static file portion 216A, a procedural content generation portion 220B, which may be same as or similar to the procedural content generation portion 220A, and a hash portion 224B which may be the same as or similar to the hash portion 224A. The Post-PCG package 228 differs from the Pre-PCG package 204 by including content generated utilizing one or more procedures and/or seeds located in the procedural content generation portion 220A of the Pre-PCG package 204 to generate or otherwise create the procedural generated output portion 232. That is, once the Pre-PCG package 204 has been downloaded to a client device 116A-E for example, one or more applications, executable files, scripts, and/or procedures residing within the procedural content generation portion 220A may be executed. By executing the one or more applications, executable files, scripts, or procedures residing in the procedural content generation portion 220A, the procedural generated output portion 232 is generated or otherwise created. Because the hash portion 224A includes anti-tamper hashes for the procedural generated output portion 232, the hash portion 224A may be the same as the hash portion 224B. That is, the Merkel tree for example in the hash portion 224B of the Post-PCG package 228 may match the hash portion 224A of the Pre-PCG package 204.

Figure 3:
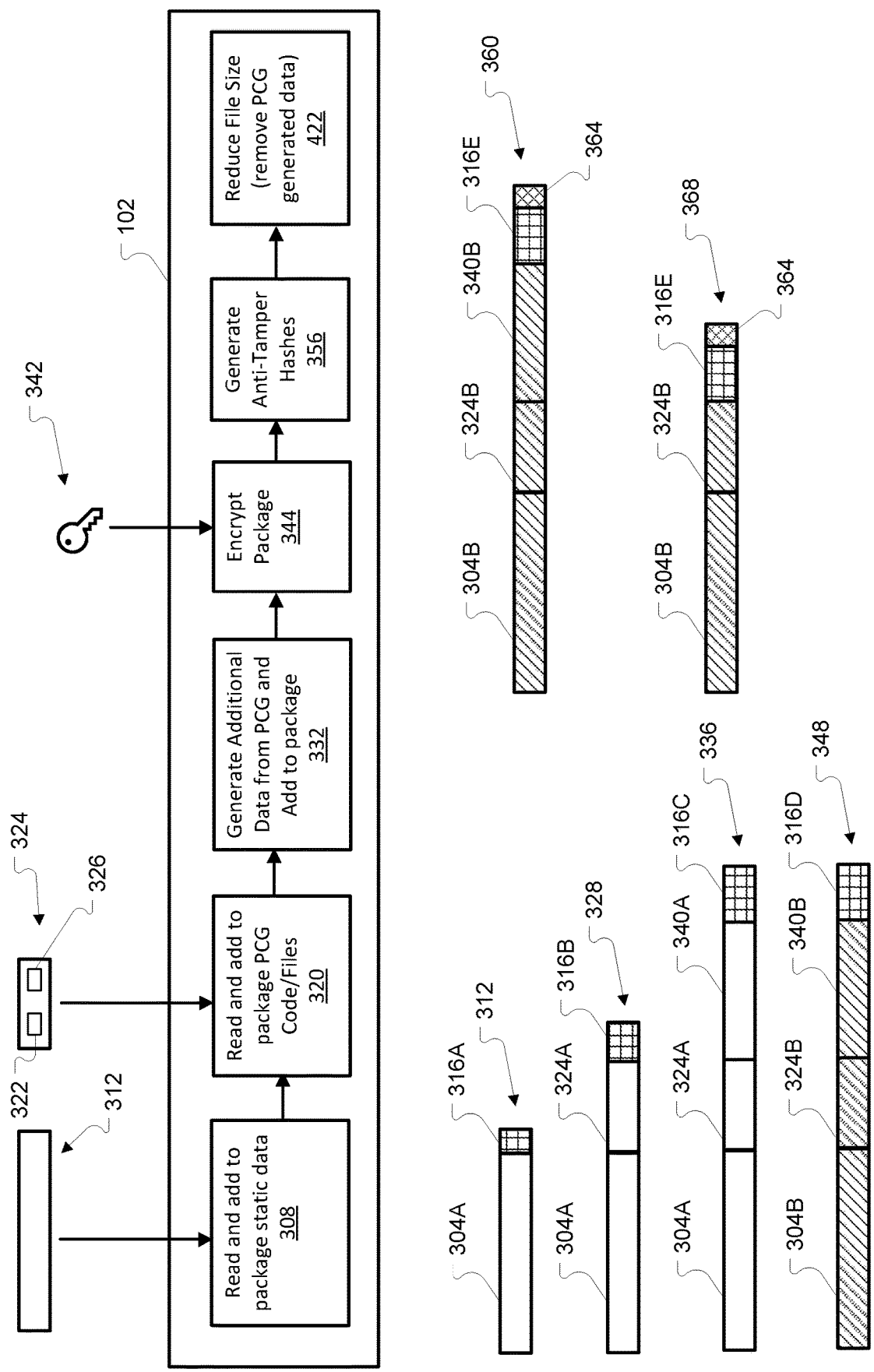
FIG. 3 depicts details directed to a Pre-Procedural Content Generation package, file, and/or image creation and procedural generated output creation process in accordance with examples of the present disclosure.

In accordance with examples of the present disclosure, FIG. 3 depicts additional details related to generating a Pre-PCG package, for example, a Pre-PCG package 204. In some examples, the Pre-PCG package may be created at a content provider 102 in a content generator 108 for example. The content provider 102, and/or the content generator 108, may read in static data 312 at 308. The static data 312 may be the same as or similar to the static data, or static files, described with respect to the static file portion 216A of FIG. 2. In some examples, the static data 312 may include a static file portion 304A and another portion 316A. The portion 316A may correspond to a header portion and/or a metadata portion. The content provider, and/or the content generator 108, may read in procedural content generation code and/or procedural content generation files 324A at 320. The procedural content generation code may be the same as or similar to the procedural content generation portion 220A described with respect to FIG. 2. Moreover, and as illustrated in FIG. 3, the procedural content generation code and/or procedural content generation files 324 may include one or more seed portions 322 and/or one or more procedure portions 326. The one or more seed portions 322 may be additional data, files, and/or chunks that may be or may not be specific to a targeted platform. The one or more procedure portions 326 may correspond to one or more algorithms, executable files, and/or procedures that operate upon the seed portion 322 and/or other data of the static data 304. The procedural content generation code and/or procedural content generation files 324 may be added to the static file portion 304A including static data. An intermediate file 328 illustrated in FIG. 3 depicts the procedural content generation code and/or procedural content generation files 324 combined with the static file portion 304A including static data in accordance with examples of the present disclosure. The portion 316B may correspond to a header portion and/or a metadata portion.

At 332, the content provider 102 and/or the content generator 108 may utilize the procedural content generation code and/or procedural content generation files 324 to generate the procedural generated output 340 for example. The procedural generated output 340A may be the same as or similar to the procedural generated output portion 232 of FIG. 2. For example, one or more applications, executable files, scripts, and/or procedures residing within the procedural content generation code and/or procedural content generation files 324A may be executed. By executing the one or more applications, executable files, scripts, and/or procedures residing within the procedural content generation code and/or procedural content generation files 324A, the procedural generated output 340A is generated or otherwise created. Accordingly, an intermediate file 336 depicts the static file portion 304A including static data, procedural content generation code and/or procedural content generation files 324A, and the procedural generated output 340A, where the portion 316C may correspond to a header portion and/or a metadata portion.

At 344, the content provider 102 and/or the content generator 108 may receive an encryption key 342. The encryption key may be provided by an entitlement management system maintained by the content provider 102. In some instances, the encryption key 342 may be an encryption key for encrypting one or more portions of the intermediate file 336; the one or more portions of the intermediate file 336 may be encrypted using AES-256, DES, FIPS or other encryption algorithms for example. The encryption key 342 may correspond to a single encryption key or may correspond to multiple encryption keys. The result of 344 may be an intermediate file, such as an encrypted package 348. The encrypted package 348 may include an encrypted file portion 304B corresponding to the unencrypted portion, or clear text portion, 304A. The encrypted package 348 may include an encrypted portion 324B corresponding to the unencrypted portion, or clear text portion, 324A. The encrypted package 348 may include an encrypted portion 340B corresponding to the unencrypted portion, or clear text portion, 340A. Similar to the intermediate file 336, the encrypted package 348 may include a header portion and/or a metadata portion 316D.

At 356, the content provider 102 and/or the content generator 108 may generate anti-tamper hashes based on the encrypted file portion 304B, encrypted portion 324B, and/or the encrypted portion 340B. In some aspects, the anti-tamper hashes may be based on the encrypted file portion 304B, encrypted portion 324B, the encrypted portion 340B, and the header portion and/or a metadata portion 316D. Accordingly, the generated hash portion 364 may be added to the encrypted package 348 resulting in an intermediate file 360. The intermediate file 360 may include the encrypted file portion 304B, the encrypted portion 324B, the encrypted portion 340B, and the header portion and/or a metadata portion 316E. In accordance with examples of the present disclosure, the intermediate file may be distributed as a content package. Alternatively, or in addition, a size, such as a file size, of the intermediate file 360 may be reduced by removing the encrypted portion 340B corresponding to the procedural generated output 340A. That is, because the procedural generated output 340A can be generated based on the procedural content generation code and/or procedural content generation files 324 and/or the static file portion 304A, the encrypted portion 340B can be removed, resulting in a decreased file size for transfer and/or storage. Thus, a Pre-PCG package 368 may be generated at 422. The Pre-PCG package 368 may be the same as or similar to the Pre-PCG package 204.

Figure 4:
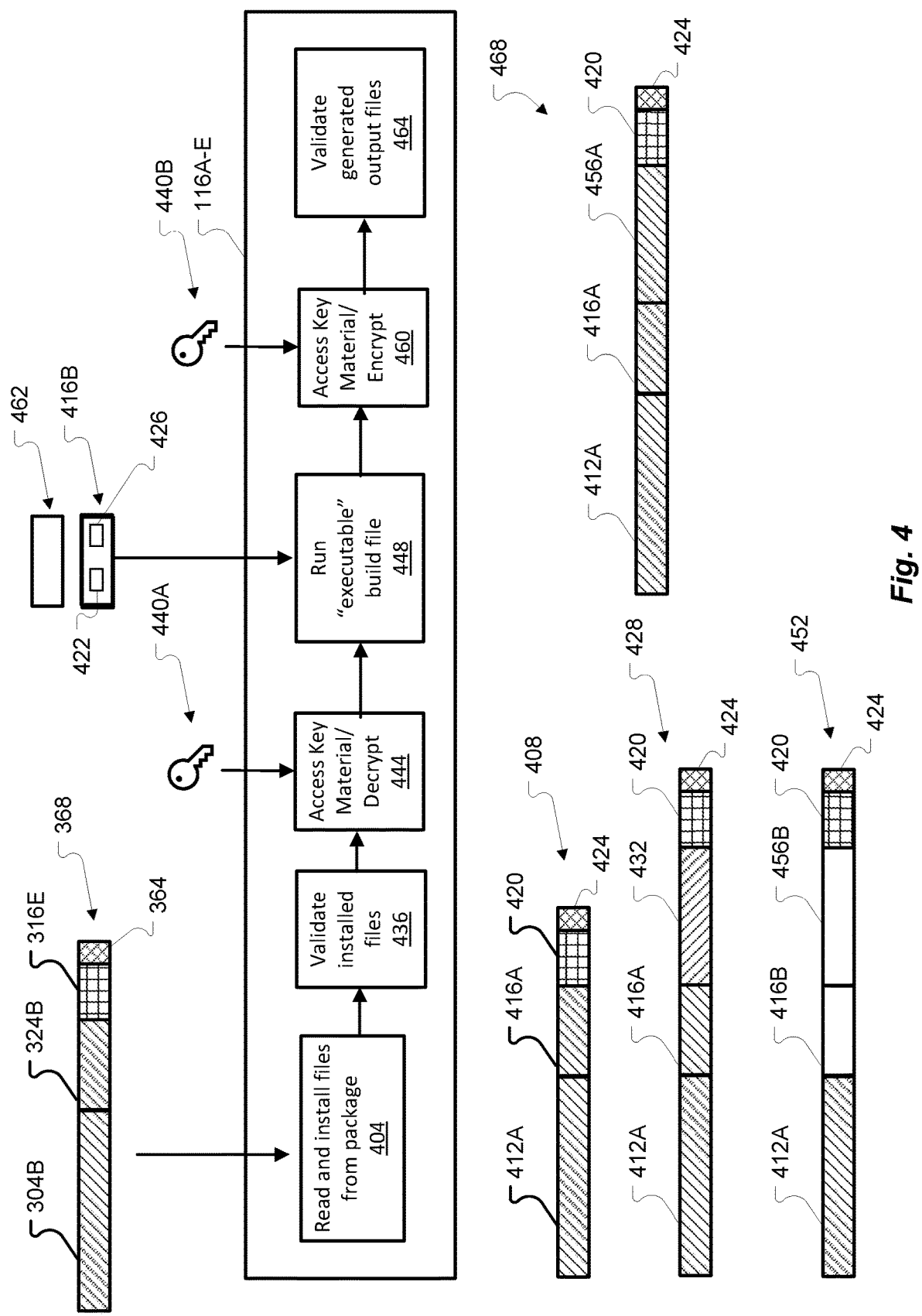
FIG. 4 depicts details directed to a Pre-Procedural Content Generation package, file, and/or image installation and procedural generated output creation process in accordance with examples of the present disclosure.

In accordance with examples of the present disclosure, FIG. 4 depicts additional details related to generating procedural generated content based on the Pre-PCG package 368. More specifically, a client device 116A-E may receive the Pre-PCG package 368 for installation via a communication interface. At 404, the client device 116A-E may read, store, and/or install at least a portion of the Pre-PCG package 368. For example, the Pre-PCG package 368, when stored, may correspond to the Pre-PCG package 408. That is, an encrypted file portion 304B may correspond to or otherwise be the same as encrypted static file portion 412A. An encrypted procedural content generation code and/or procedural content generation files 324B may correspond to otherwise be same as the encrypted procedural content generation code and/or procedural content generation files 416A. The header portion and/or a metadata portion 316E may correspond to or otherwise be the same as the header portion and/or metadata portion 420. Lastly, the generated hash portion 364 may correspond to or otherwise be the same as the generated hash portion 424.

Once the installation of the encrypted static file portion 412A and the encrypted procedural content generation code and/or procedural content generation files 416A has been completed, one or more storage locations may be reserved or otherwise identified for procedural generated output. For example, storage space 432 may be reserved for procedural generated output generated based on the static file portion 412A and/or the procedural content generation code and/or procedural content generation files 416A. As the header and/or metadata portion 420 includes identifiers and/or lists all files that should be included in a Post-PCG package, the size of the reserved storage space 432 may be based on the information in the header and/or metadata portion 420. As depicted in FIG. 4, the reserved storage space 432 may be part of an intermediate file 428.

In addition, once the installation of the encrypted static file portion 412A and the encrypted procedural content generation code and/or procedural content generation files 416A has been completed, one or both of the static file portion 412A and the encrypted procedural content generation code and/or procedural content generation files 416A may be validated utilizing the anti-tamper hashes from the hash portion 424 at 436. For example, one or more hashes of the static file portion 412A may be generated and compared to one or more hashes for the static file portion 412A that were stored or otherwise associated with the hash portion 424. If the anti-tamper hashes match, then the download, transfer, and/or installation of the encrypted static file portion 412A is said to have been validated. Similarly, one or more hashes of the encrypted procedural content generation code and/or procedural content generation files 416A may be generated and compared to one or more hashes for the encrypted procedural content generation code and/or procedural content generation files 416A that were stored or otherwise associated with the hash portion 424. If the anti-tamper hashes match, then the download, transfer, and/or installation of the encrypted procedural content generation code and/or procedural content generation files 416A is said to have been validated.

At 444, key material 440A may be accessed to decrypt at least one portion of the encrypted procedural content generation code and/or procedural content generation files 416A. The key material 440A, may be the same key as the 342 and may be provided by an entitlement management system maintained by the content provider 102. In some instances, the key material 440A may be an encryption key for decrypting one or more portions of the static file portion 412A and/or the procedural content generation code and/or procedural content generation files 416A. The key material 440A may correspond to a single encryption key or may correspond to multiple encryption keys. At 444, one or more portions of the procedural content generation code and/or procedural content generation files 416A may be decrypted utilizing the key material 440A. The result of decrypting the encrypted procedural content generation code and/or procedural content generation files 416A is unencrypted procedural content generation code and/or procedural content generation files 416B.

The unencrypted procedural content generation code and/or procedural content generation files 416B may then be used at 448 to generate or otherwise create the procedural generated output 456B. The client device 116A-E may read in procedural content generation code and/or procedural content generation files 416B at 448. The procedural content generation code may be the same as or similar to the procedural content generation portion 220A described with respect to FIG. 2. Moreover, and as illustrated in FIG. 4, the procedural content generation code and/or procedural content generation files 416B may include one or more seed portions 422 and/or one or more procedure portions 426. The one or more seed portions 422 may be same as or similar to the one or more seed portions 322 and the one or more procedure portions 426 may be same as or similar to the one or more procedure portions 326. Accordingly, the one or more seed portions 422 may be additional data, files, and/or chunks that may be or may not be specific to a targeted platform. The one or more procedure portions 426 may correspond to one or more algorithms, procedures, executable files, and/or procedures that operate upon the seed portion 422 and/or other data 460. The other data 460 may originate from static files based on the encrypted (or decrypted) static file portion 412A. At 448, the one or more algorithms, procedures, executable files, and/or procedures that operate upon the seed portion 422 and/or other data 460 may be executed or otherwise ran and may result in the procedural generated output 456B. An intermediate file 452 depicting a package with encrypted static file portion 412A, the unencrypted procedural content generation code and/or procedural content generation files 416A, and an unencrypted procedural generated output 456B is illustrated.

At 462, key material 440B may be accessed to encrypt the procedural content generation code and/or procedural content generation files 416A and the unencrypted procedural generated output 456B. The key material 440B, may be the same key as the 342 and/or 440A and may be provided by an entitlement management system maintained by the content provider 102. The key material 440B may correspond to a single encryption key or may correspond to multiple encryption keys. The result of encrypting the encrypted procedural content generation code and/or procedural content generation files 416B and the procedural generated output 45B at 462 is the Post-PCG package 468. The Post-PCG package 468 may be the same as or similar to the intermediate file 360 of FIG. 3. At 464, one or more portions of the Post-PCG package 468 may be validated utilizing the anti-tamper hashes from the hash portion 424. For example, one or more hashes of the procedural generated output 456A may be generated and compared to one or more hashes for the procedural generated output 456A that were stored or otherwise associated with the hash portion 424. If the anti-tamper hashes match, then the generation of the procedural generated output is said to have been validated. If the anti-tamper hashes do not match, then the Post-PCG package 468 may be downloaded or otherwise acquired from a content provider, such as content provider 102.

For example, in instances where the anti-tamper hashes do not match at 464, the process for generating procedural generated content based on the Pre-PCG package content depicted in FIG. 4 may be executed again. Alternatively, or in addition, portions of the gold standard version where the anti-tamper hashes don't match the gold standard version's anti-tamper hashes will be downloaded from the server and applied to the Post-PCG package 468 (the data is copied directly). The hashes are then validated again. Accordingly, a fallback and repair process may be executed allowing the repair of the procedurally generated content without resorting to downloading the entire gold standard version such that only a minimal amount of data needed to repair a hash tree and make the generated data match the gold standard version's data are needed. Alternatively, or in addition, the entire gold standard version residing at the content provider 102 may be downloaded. For example, the gold standard version image may be requested from the content provider 102.

Figure 5:
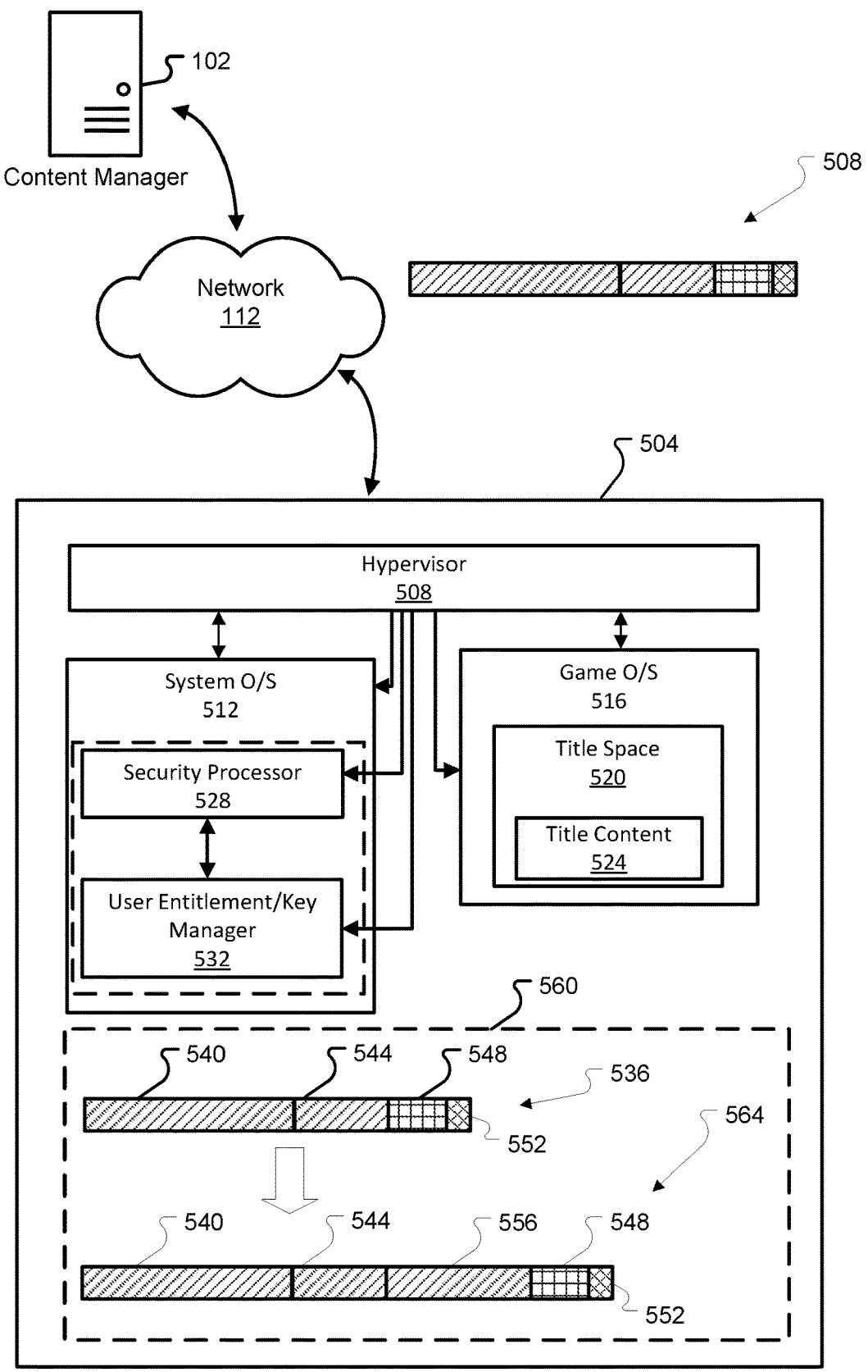
FIG. 5 depicts additional details directed to a Pre-Procedural Content Generation package, file, and/or image installation and procedural generated output creation process.

FIG. 5 depicts additional details of a content distribution process in accordance with examples of the present disclosure. As previously discussed, the content provider 102 may include a content generator 108; the content generator 108 may generate a Pre-PCG package 502 and distribute the Pre-PCG package 502 to an endpoint device such as an endpoint 504. The endpoint 504 may correspond to a game console for instance and may be the same as or similar to one or more of the client devices 116A-E as previously discussed.

The endpoint 504 may include a hypervisor portion 508, a system operating system 512 and a game, or title, operating system 516. The hypervisor portion 508 may be software, firmware or hardware that creates and/or runs virtual machines, or an operating system in a virtual environment. That is, a hypervisor portion 508 may provide an environment for one or more operating systems to execute. The hypervisor portion 508 may coordinate access to one or more system resources, such as a storage location 560, one or more processors, one or more communication interfaces, memory, and the like. The game operating system 516 may be provided as a space or location for the title to install and execute. For example, the game operating system 516 may include title space 520 and title content 524. The title space 520 may be space require for the title to execute and store data, generated content, or otherwise. The title content 524 may correspond to the content of the title package having been validate against a "gold-standard" package for example.

The system operating system 512 may coordinate the interaction of the game operating system 516 with other portions of the endpoint 504. For example, the system operating system 512 may include a security processor 528 that is configured to decrypt one or more portions of the Pre-PCG package 502. Moreover, the system operating system 512 may facilitate the user entitlement processes such that the correct decryption keys for decrypting the Pre-PCG package 502 are obtained. Such keys may be associated with a user account, such as when a user is signed into an account and has been properly verified and or authorized to access the tile and/or the update package. Alternatively, or in addition, the user entitlement/key manager 532 may obtain one or more keys from an external location associated with media, such as a DVD and/or CD for instance.

In accordance with examples of the present disclosure, the system operating system 512 may receive or otherwise access the Pre-PCG package 502 via the hypervisor portion 508 and store the Pre-PCG package 502 in the storage portion 560 as a Pre-PCG package 536. The Pre-PCG package 536 may be same as or similar to the Pre-PCG package 368 discussed in FIG. 3. The security processor 528 may decrypt one or more portions of the Pre-PCG package 536 and provide the one or more portions of the decrypted Pre-PCG package 536 to the game operating system 516. The game operating system 516 may then utilize an unencrypted data corresponding to the procedural content generation code and/or procedural content generation files 544 to generate procedural generated output as previously discussed in FIG. 4. When the game operating system 516 is finished generating content, the game operating system 516 may instruct the security processor 528 to encrypt the newly generated content with the appropriate security keys.

The game operating system 516 may then instruct the security processor 528 to verify that the encrypted procedural generated output 556 corresponding to encrypted procedural generated output, matches the encrypted portion found in the "gold-standard" image by generating anti-tamper hashes based on the encrypted procedural generated output and comparing the generated anti-tamper hash to a received anti-tamper hash in the Pre-PCG package 502. That is, the anti-tamper hashes 552 generally correspond to the anti-tamper hashes 424 as previously discussed. If the anti-tamper hashes 552 match the generated anti-tamper hashes based on the encrypted procedural generated output 556, then the procedural generated output 556 content is determined to be correct or otherwise validated. Accordingly, the Post-PCG package 564 may include the same content or otherwise match a "gold-standard" package. That is, the static file portion 540, the procedural content generation code and/or procedural content generation files 544, the procedural generated output 556, the header and/or metadata portion 548, and the anti-tamper hashes 552 may be identical to an encrypted "gold-standard" version of the title content.

While the security processor 528 and the user entitlement/key manager 532 are depicted as being part of or otherwise run at the system operating system 512, the security processor 528 and/or the user entitlement/key manager 532 may be executed at any location of the endpoint 504. For example, the decryption of the Pre-PCG package 502 may occur within the game operating system 516; the encryption of the Post-PCG package 564 may occur within the Game operating system 516. In some examples, the system operating system 512 may utilize an unencrypted data corresponding to the procedural content generation code and/or procedural content generation files 544 to generate procedural generated output as previously discussed in FIG. 4. That is, the generating of the Post-PCG package 564 may be performed at the system operating system.

In accordance with examples of the present disclosure, the endpoint 504 may execute a single operating system or otherwise referred to as a general operating environment. That is, and for example, the endpoint 504 may include a single system operating system, may perform the decryption of the Pre-PCG package 502 at the single operating system, may utilize unencrypted data corresponding to the procedural content generation code and/or procedural content generation files 544 to generate procedural generated output as previously discussed in FIG. 4 with a single operating system, and may encrypt such data to generate the Post-PCG package 564 with the same single operating system. Thus, one or more steps included in the generation of the Post-PCG file 564 as described in FIG. 2, FIG. 4, and FIG. 5 may occur within a general environment of a client computer, smartphone, or other device.

Figure 6:
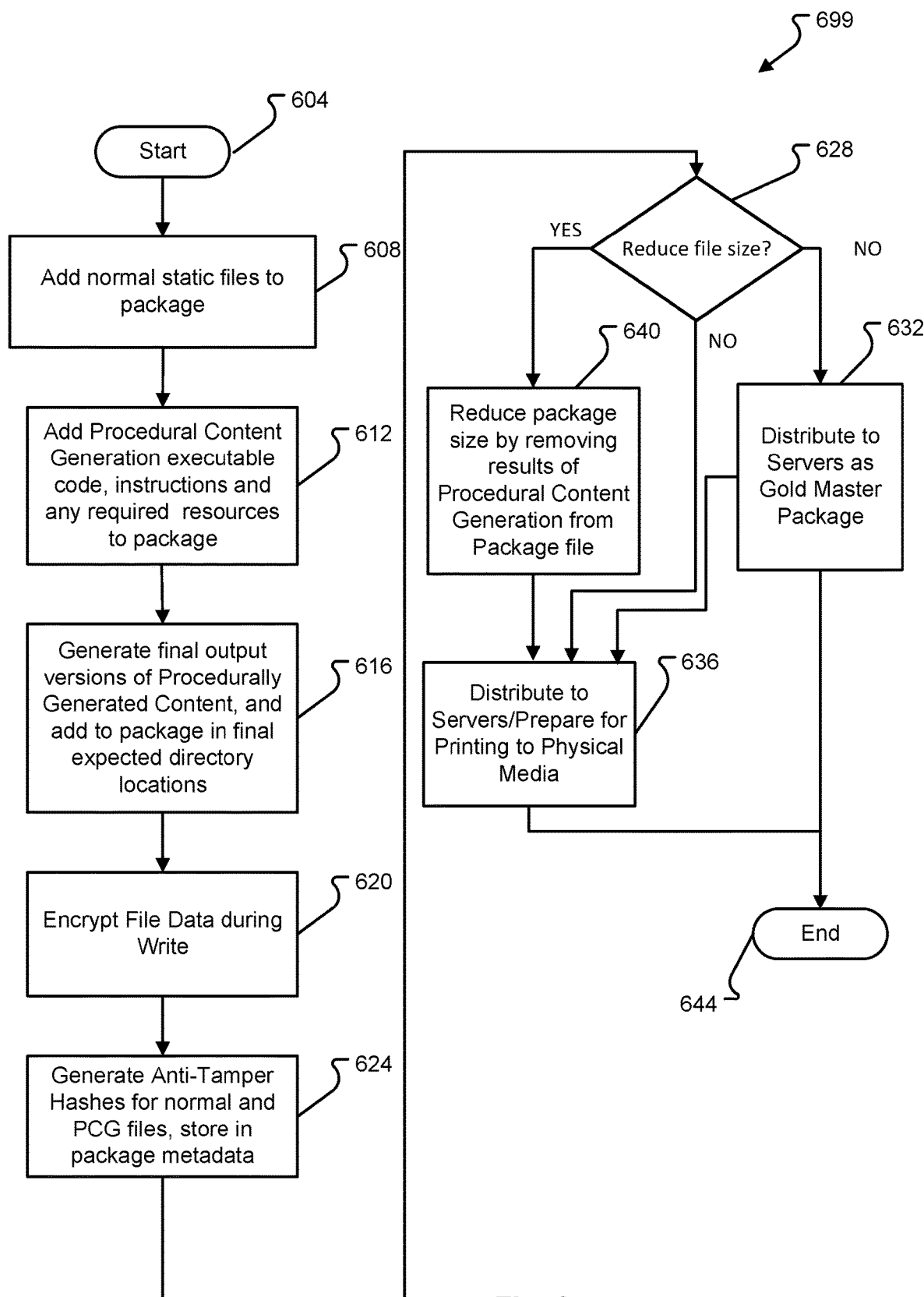
FIG. 6 depicts details of a method for generating a Pre-Procedural Content Generation package, file, and/or image in accordance with examples of the present disclosure.

FIG. 6 depict details of a method 600 for creating a Pre-PCG package in accordance with examples of the present disclosure. A general order for the steps of the method 600 is shown in FIG. 6. Generally, the method 600 starts with a start operation 604 and ends with the generation of one or more of the file Pre-PCG package and/or a "gold-standard" image, package, or file for distribution. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method 600 starts at 604 by receiving an indication to create a file, package, or image for distribution. At 608, one or more static files may be received. The one or more static files may be located in a similar area or otherwise assembled into a static file portion, such as one or more of the previously described static file portions 304A and/or 312 for example. The method 600 may flow to 612 where procedural content generation code and/or procedural content generation files may be added. For example, the procedural content generation code and/or procedural content generation files may be added to the file, image, or package including the static file portions. The procedural content generation code and/or procedural content generation files may be same as or similar to the procedural content generation code and/or procedural content generation files 324. For example, the procedural content generation code and/or procedural content generation files may include one or more seed portions and/or one or more procedure portions. The one or more seed portions may be same as or similar to the one or more seed portions 322 previously described. The one or more procedure portions may be the same as or similar to the one or more procedure portions 326 previously described. The method may then generate one or more final output version of the procedural generated output. In some instances, the procedural content generation code and/or procedural content generation files maybe specific to a target system such that a first procedural generated output corresponds to a specific target system and a second procedural generated output corresponds to a second specific target system. The final Pre-PCG package may include one or more of the first or second procedural generated output.

The method may move to 620 where the static file portion, procedural content generation code and/or procedural content generation files, and the procedural generated output may be encrypted using one or more encryption keys as previously discussed. At 624, the method may proceed to generate anti-tamper hashes for the static files, procedural content generation code and/or procedural content generation files, and the procedural generated output. Such anti-tamper hashes may be stored in a hash portion as package metadata. The method 600 may then determine if the package created thus far should be reduced in size at 628. If the package created should be reduced in size, the method 600 may proceed to 640 where the procedural generated output may be removed from the package, file, or image creating the Pre-PCG package. The Pre-PCG package may be distributed to one or more servers, for example 108, of the content provider 102 at 636. In some instances, the Pre-PCG package may be prepared for printing to a physical media and/or printed to physical media, such as DVD media, at 636. If the file is not to be reduced in size, the larger file, package, or image that includes the procedural generated output may be distributed to one or more servers as a gold master package at 632 and then distributed to one or more servers, for example 108, of the content provider 102 at 636. In some instances, the larger file, package, or image that includes the procedural generated output may be prepared for printing to a physical media and/or printed to physical media at 636. The method 600 may end at 644.

Figure 7:
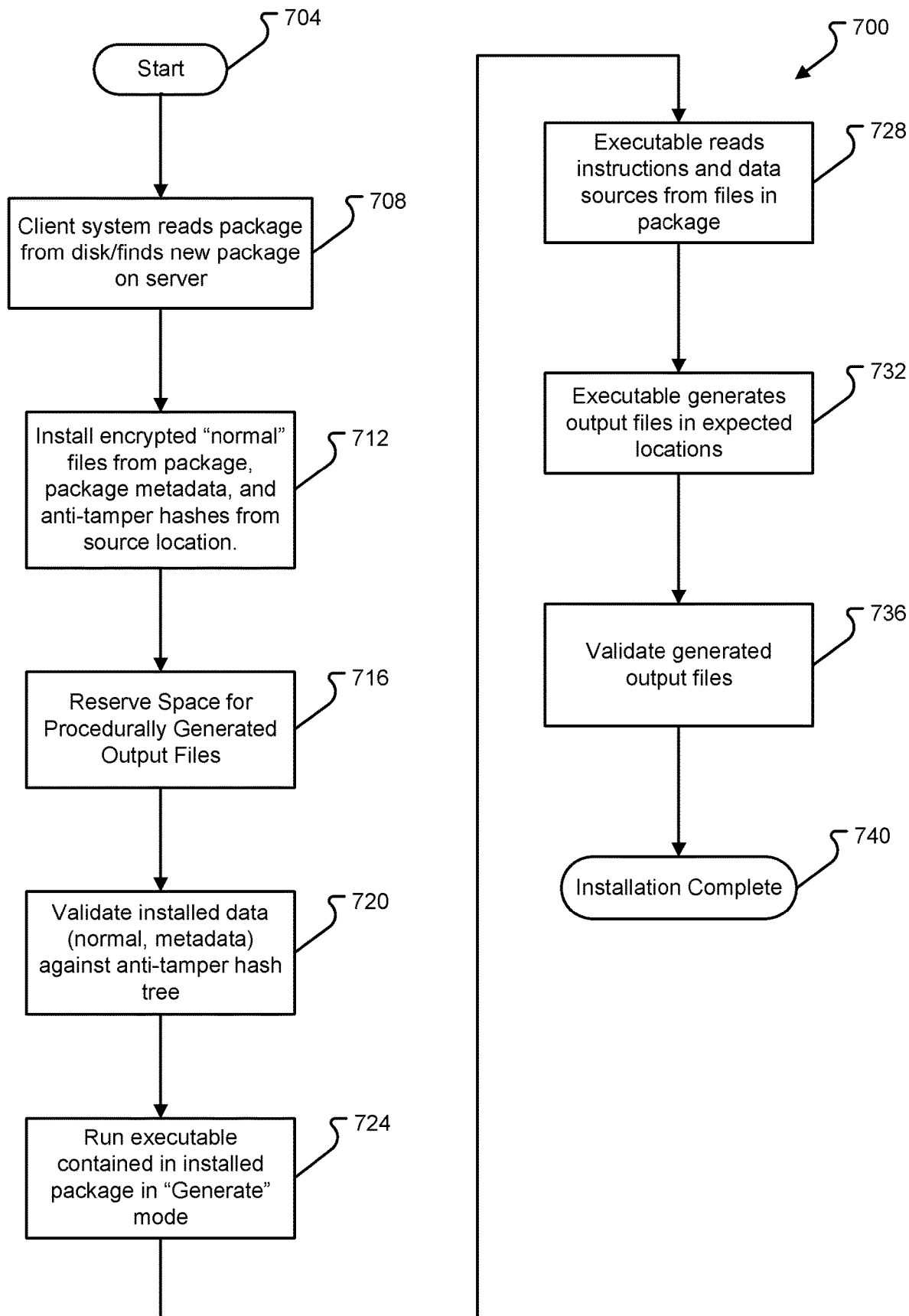
FIG. 7 depicts details of a method for installing and generating procedural generated output in accordance with examples of the present disclosure.

FIG. 7 depicts details of a method 700 for installing a Pre-PCG package, file, or image and then generating procedural generated output at a client device in accordance with examples of the present disclosure. A general order for the steps of the method 700 is shown in FIG. 7. Generally, the method 700 starts with a start operation 704 and ends with the end operation 724. The method 700 may include more or fewer steps or may arrange the order of the steps differently than those shown in FIG. 7. The method 700 may be executed as a set of computer-executable instructions executed by a computer system and encoded or stored on a computer readable medium. Further, the method 700 may be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method 700 starts at 704 wherein an indication may be sent and/or received by a client device, such as a client device 116A-E at 708. The client device 116A-E may acquire a Pre-PCG package, such as the Pre-PCG package 368 at 708. From the Pre-PCG package 368, one or more of the static file portions, such as the normal files, the package metadata, and the anti-tamper hashes may be installed at the client device 116A-E. The method 700 may also reserve or otherwise identify space for the procedural generated output at 716 as previously discussed. At 720, the static file data, and in some instances, the procedural content generation code and/or procedural content generation files may be validated against one or more anti-tamper hashes from the hash portion of the Pre-PCG package. That is, one or more hashes may be generated based on the static file content, the procedural content generation code and/or procedural content generation files, and/or the metadata content installed at the client device 116A-E.

Upon successful validation, one or more of the procedural content generation code and/or procedural content generation files, which may include one or more seed portions and/or one or more procedure portions, are executed to generate the procedural generated output at 724. More specifically, a procedure, algorithm, script, executable, application, and/or instructions are run and may operate on seed data and/or other data of the Pre-PCG package, file, or image that may be read in to the client device 116A-E. Such reading of the seed data and/or other data of the Pre-PCG package may occur at 728. The method 700 may then flow to 732, where procedural generated output is generated and stored at expected locations. For example, the previously reserved space or location may include the procedural generated output. At 736, the method 700 may encrypt and/or encrypt the procedural generated output. Method 700 then ends at 740.

Figure 8:
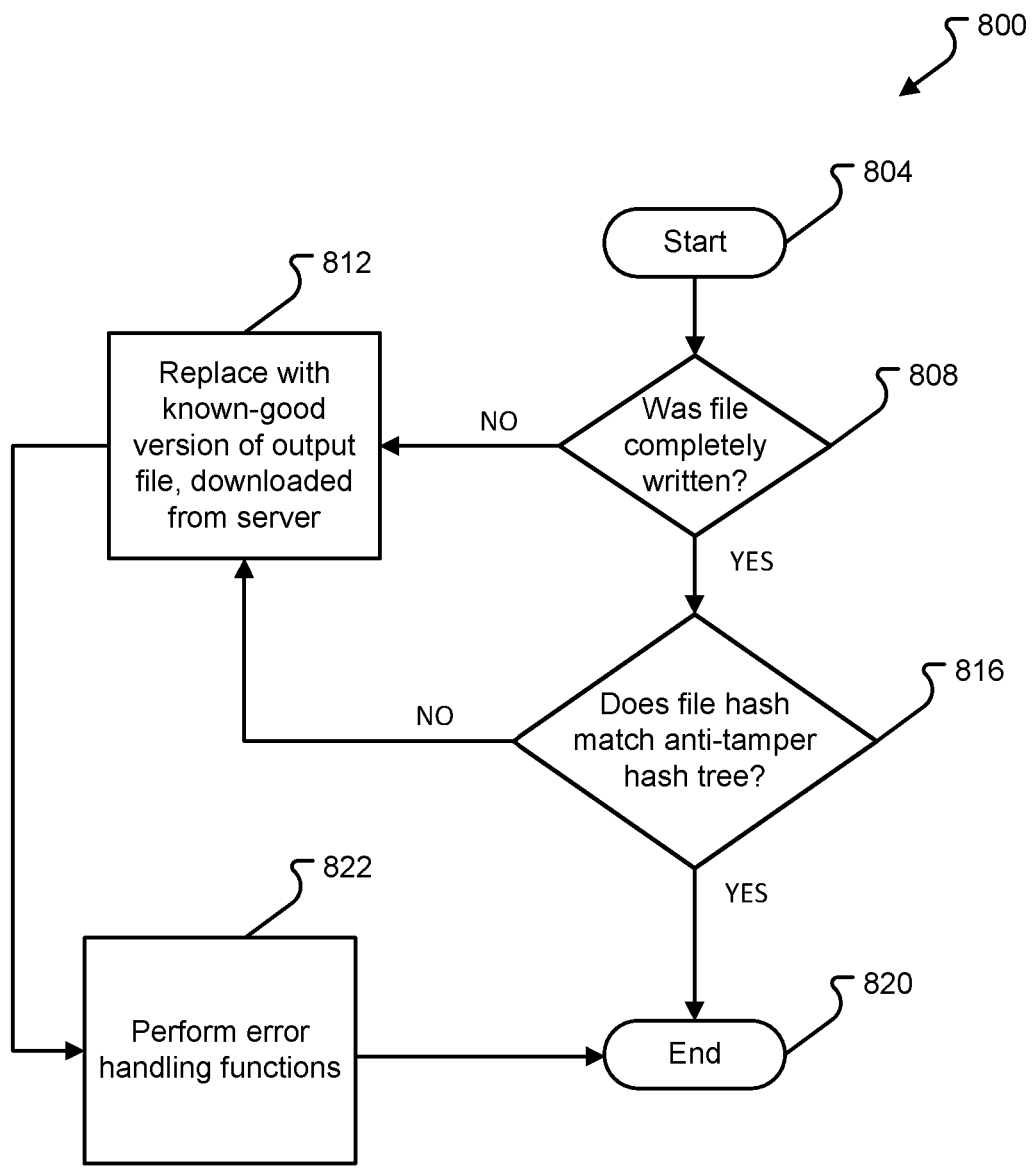
FIG. 8 depicts details of a method for validating procedural generated output in accordance with examples of the present disclosure.

FIG. 8 depicts details of a method 800 for validating procedural generated output in accordance with examples of the present disclosure. A general order for the steps of the method 800 is shown in FIG. 8. Generally, the method 800 starts with a start operation 804 and ends with the end operation 820. The method 800 may include more or fewer steps or may arrange the order of the steps differently than those shown in FIG. 8. The method 800 may be executed as a set of computer-executable instructions executed by a computer system and encoded or stored on a computer readable medium. Further, the method 800 may be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7.

The method 800 starts at 804 following the generation of the procedural generated output at step 736 of method 700. That is, once the procedural generated output is generated, the method 800 may be initiated at 804. At 808, the method 800 determines whether or not the Post-PCG package was completely written. In other words, if the procedural generated output was not generated, then the method 800 may flow to step 812 where a known-good version of the post-PCG package and/or file is obtained. In some instances, only a known-good version of the procedural generated output may be obtained, such than an image, file, or package residing at the client device 116A-E may simply add such file to existing data. Once the known-good version is obtained, the method 800 may end at 820. In some instances, where the Post-PCG package, file, or image has been completely written, the method 800 may proceed to generate hashes based on the procedural generated output and verify that the generated hashes match the hashes found in the anti-tamper hash tree as provided in the in Pre-PCG package, file, or image. If the hashes match, then the method 800 proceeds to 820. However, if the hashes do not match, then the method 800 proceeds to 812, where a known-good version of the post-PCG package and/or file is obtained as previously described. Following 812, the method 800 may proceed to one or more error handling steps to ensure that the known-good version of the post-PCG package and/or file is valid and may return to 808 in some instances and/or end at 820.

Figure 9:
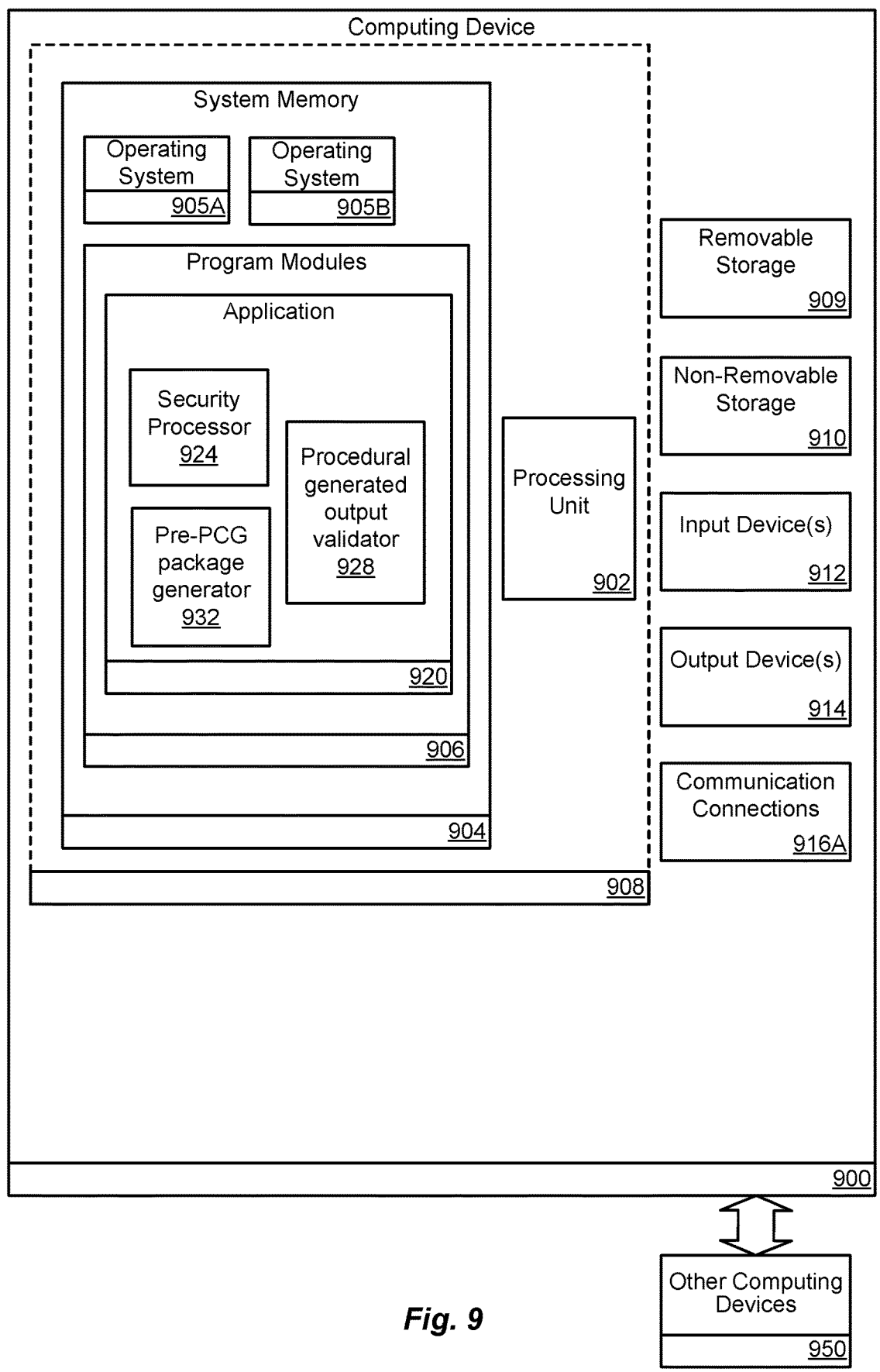
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices, such as the client device 116, and/or the content generator 108, as described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905A and 905B and one or more program modules 906 suitable for performing the various aspects disclosed herein such as the security processor 924, the procedural generated output validator 928, and/or the content generator 932. The operating system 905A, for example, may be suitable for controlling the operation of the computing device 900. The operating system 905B, for example, may be suitable for controlling game and/or title execution. Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., one or more applications 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

In accordance with examples of the present disclosure, the use of a "gold-standard" master image on a server may be used to rescue the content in the case of failure, where the integrity hashes don't match the generated data is contemplated and described. Further, one or more decompression and procedural generation of encrypted file data from its compressed/seed form to a fully expanded form ready for high-performance use by the application, via any of a number of different mechanisms for generating the file data, including but not limited to: standard compression/decompression codecs such as LZ compression, arithmetic compression, JPEG compression; recompression of those assets into a form suitable for use by a game title or GPU—for example, decompressing asset meshes stored in high-resolution curve forms to triangle meshes, or generating GPU-efficient forms of textures from glossy-compressed images (e.g. JPEG-compressed textures to DXn or BCn graphics formats), retiling images on the fly, or generating or discarding MW levels in texture chains; use of machine learning techniques to reconstruct textures at installation or update time; using machine learning techniques to generate any data that the game requires from a lower entropy form; generation of data from random seeds in a procedural fashion, then applying a "fixup" patch to the generated data to customize that result with human-directed intervention; and use of machine learning methods for generating speech from a markup language, and then applying fixups to customize the output to match an actor's voice, the resulting data being smaller than typical audio compression methods is contemplated and described herein. In accordance with examples of the present disclosure, launching of an application in a special install or update-time mode which instructs it to procedurally generate content from its available input data is contemplated and described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916A allowing communications with other computing devices 950. Examples of suitable communication connections 916A include, but are not limited to, radio frequency (RF) transmitter, receiver, and/or transceiver circuitry; universal serial bus (USB), parallel, network interface card, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
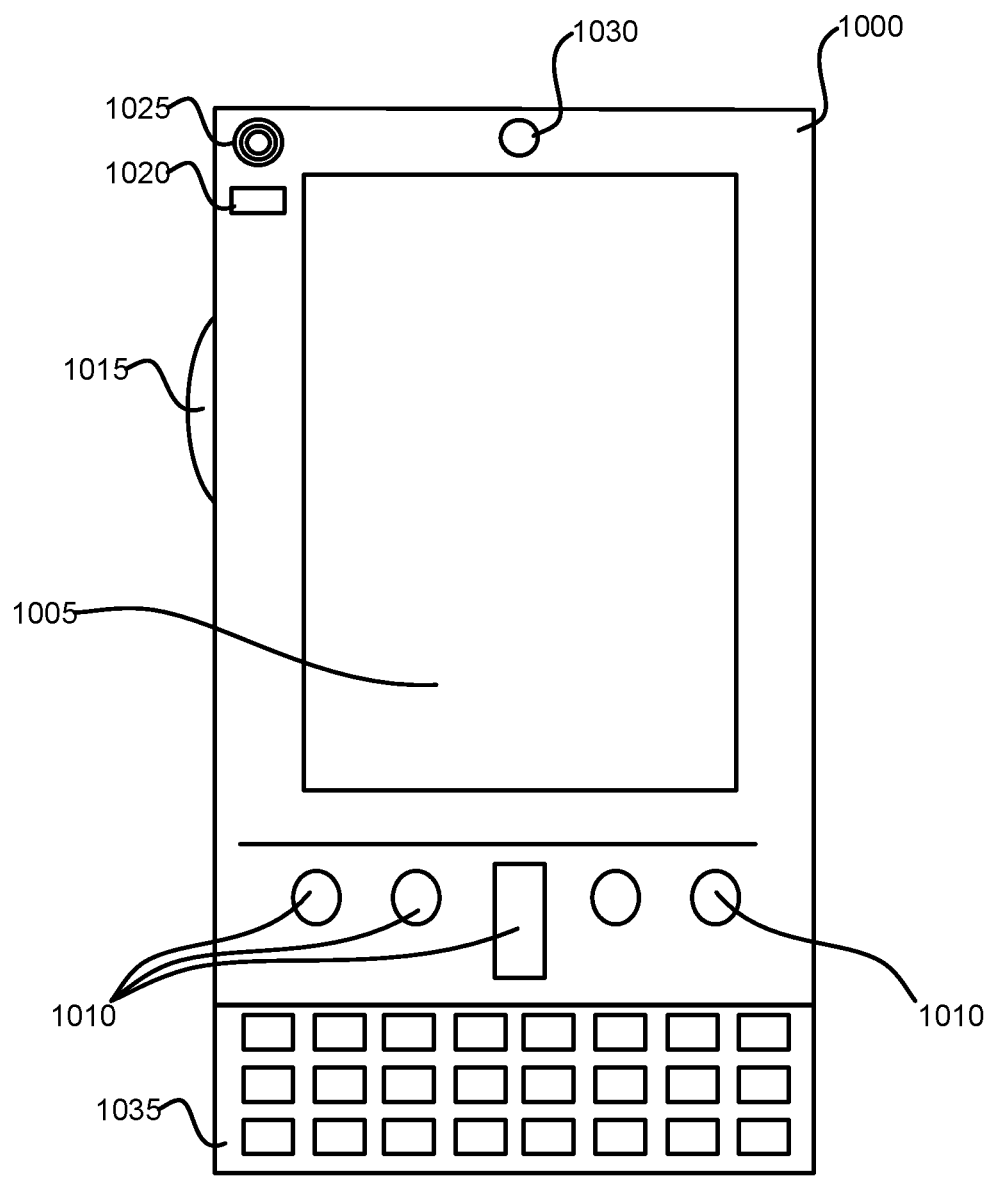
FIG. 10A is a simplified block diagram of a computing device with which aspects of the present disclosure may be practiced.
Figure 10B:
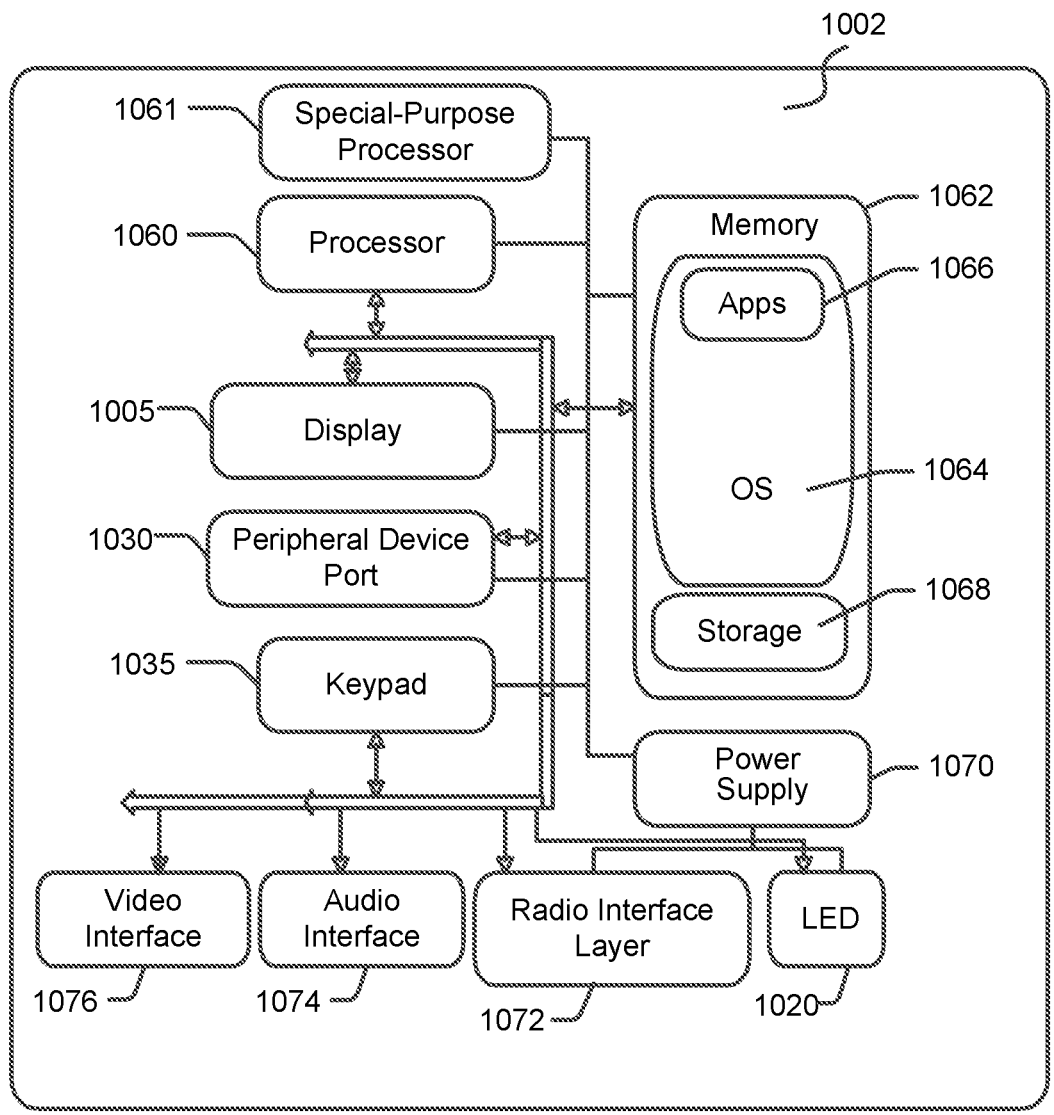
FIG. 10B is another are simplified block diagram of a mobile computing device with which aspects of the present disclosure may be practiced.

FIGS. 10A and 10B illustrate a computing device, client device, or mobile computing device 1000, for example, a mobile telephone, a smart phone, wearable computer (such as a smart watch), a tablet computer, a laptop computer, and the like, with which aspects of the disclosure may be practiced. In some aspects, the client device (e.g., 116A-116E) may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some aspects. In yet another alternative aspect, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various aspects, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external source.

FIG. 10B is a block diagram illustrating the architecture of one aspect of computing device, a server (e.g., server 104A-104D), or a mobile computing device (e.g., client device 116A-E). That is, the computing device 1000 can incorporate a system (e.g., an architecture) 1002 to implement some aspects. The system 1002 can implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, title content, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated configuration, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
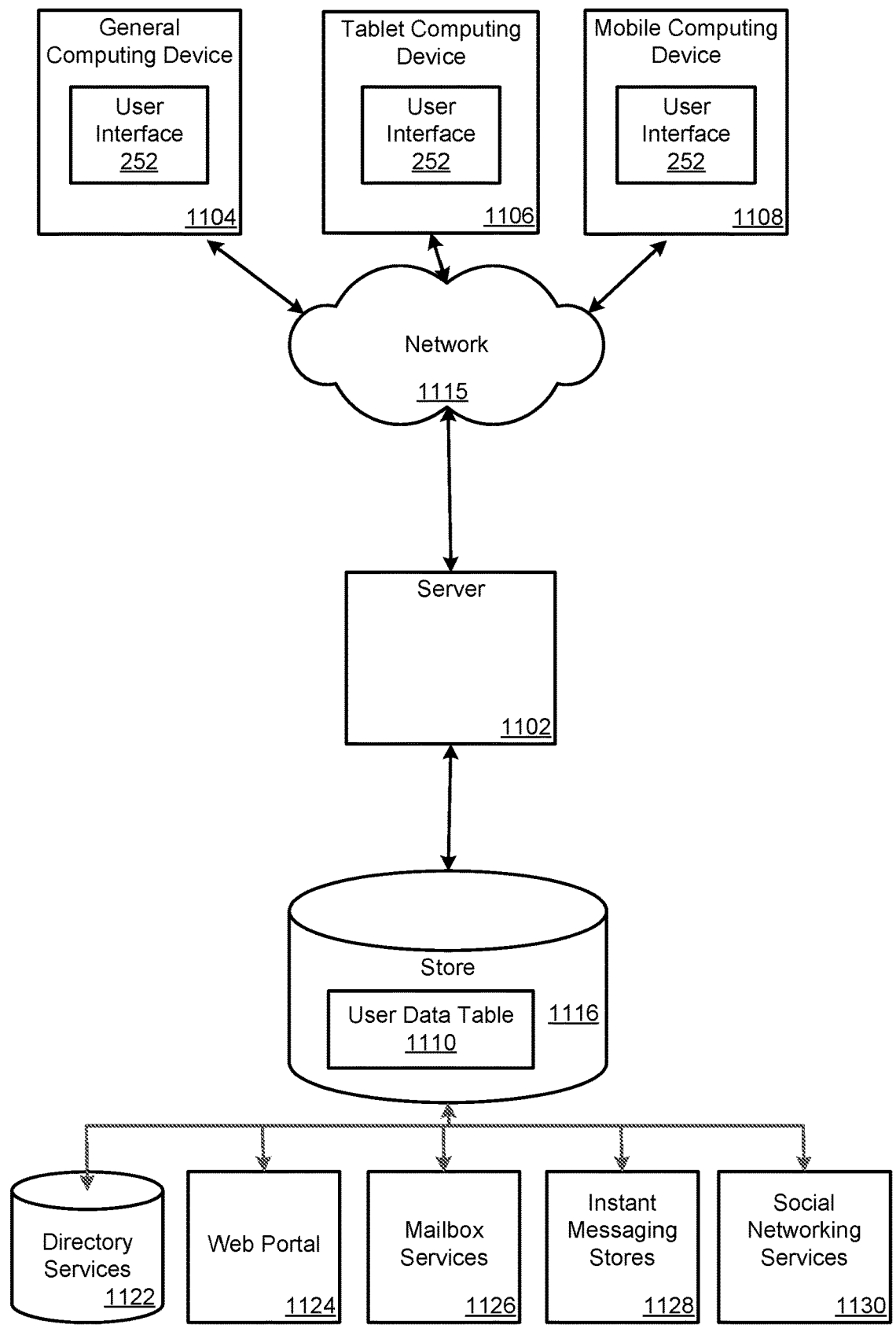
FIG. 11 is a simplified block diagram of a distributed computing system in which aspects of the present disclosure may be practiced.

FIG. 11 illustrates one aspect of the architecture of a system for processing data received at a computing system 1102 (e.g., content generator 108) from a remote source, as described above. Content at a server device 1102 may be stored in different communication channels or other storage types. For example, various game/title images and procedural generated output, and Pre-PCG packages, images, or files may be stored using a directory service 1122, a web portal 1124, a mailbox service 1126, an instant messaging store 1128, or a social networking site 1130. A unified profile API based on the user data table 1110 may be employed by a client that communicates with server device 1102, and/or the content generator may be employed by server device 1102. The server device 1102 may provide data to and from a client computing device such as the client devices 116A-116E through a network 1115. By way of example, the client device 116 described above may be embodied in a personal computer 1104, a tablet computing device 1106, and/or a mobile computing device 1108 (e.g., a smart phone). Any of these configurations of the computing devices may obtain content, such as game/title images and/or Pre-PGC packages, images, or files from the store 1116, in addition to receiving graphical data useable to be either pre-processed at a graphic-originating system, or post-processed at a receiving computing system.

The above specification, examples and data provide a complete description of the manufacture and use of the composition of the invention. Since many aspects of the invention can be made without departing from the spirit and scope of the invention, the invention resides in the claims hereinafter appended.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions that may be implemented with particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In accordance with at least one example of the present disclosure, a system for generating content for an encrypted package is provided. The system may include at least one processor, and at least one memory including instructions which when executed by the at least one processor, causes the at least one processor to receive a package including one or more anti-tamper hash portions and encrypted data, the encrypted data including one or more instructions and decrypt a portion of the encrypted data including the one or more instructions. The instructions may cause the at least one processor to generate data based on the execution of the one or more instructions and a corpus of data, encrypt the generated data, and validate the generated data utilizing one or more anti-tamper hashes from the anti-tamper hash portion of the package.

At least one aspect of the above example may include where the one or more instructions that validate the generated data utilizing one or more anti-tamper hashes from the anti-tamper hash portion of the package include generating a hash value based on an encrypted portion of the generated data, receiving a hash value from the anti-tamper hash portion of the package, and comparing the generated hash value to the received hash value. At least one aspect of the above example may include where the one or more instructions causes the at least one processor to acquire the generated data from another device if the generated hash value does not match the received hash value. At least one aspect of the above example may include where the one or more instructions causes the at least one processor to acquire a package including one or more anti-tamper hash portions and encrypted data from another device when the generated hash value does not match the received hash value, the encrypted data including second generated data. At least one aspect of the above example may include where the one or more instructions causes the at least one processor to validate the received package prior to decrypting the encrypted data including the corpus of data and the one or more instructions. At least one aspect of the above example may include where the execution of the one or more instructions generates at least one of image data, audio data, and/or texture data. At least one aspect of the above example may include where the instructions causes the at least one processor to decrypt the encrypted data in an operating system different form an operating system that generates data based on the execution of the one or more instructions. At least one aspect of the above example may include where the instructions causes the at least one processor to reserve storage space based on a metadata portion in the received package.

In accordance with at least one example of the present example, a method of generating content for an encrypted package is provide. The method may include receiving a package including one or more anti-tamper hash portions and encrypted data, the encrypted data including one or more seed portions and one or more instructions, decrypting a portion of the encrypted data including the one or more instructions and the one or more seed portions, generating data based on the execution of the one or more instructions, wherein the one or more instructions operate on the one or more seed portions, encrypting the generated data, and validating the generated data utilizing one or more anti-tamper hashes from the anti-tamper hash portion of the package.

At least one aspect of the above example may include generating a hash value based on an encrypted portion of the generate data, receiving a hash value from the anti-tamper hash portion of the package, and comparing the generated hash value to the received hash value. At least one aspect of the above example may include acquiring the generated data from a device different from which the hash value is generated if the generated hash value does not match the received hash value. At least one aspect of the above example may include acquiring a package including one or more anti-tamper hash portions and encrypted data from a device different from which the hash value is generated if the generated hash value does not match the received hash value. At least one aspect of the above example may include generating at least one of image data, audio data, and/or texture data. At least one aspect of the above example may include decrypting the encrypted data in an operating system different form an operating system that generates data based on the execution of the one or more instructions.

In accordance with at least one example of the present disclosure, a system for generating install-time procedural content for encrypted packages is provide. The system may include at least one processor and at least one memory including instructions which when executed by the at least one processor, causes the at least one processor to receive seed data and procedural instructions, execute the procedural instructions to generate content based on the seed data, encrypt the generated content, the seed data, and the procedural instructions, generate one or more anti-tamper hashes based on the encrypted content, encrypted seed data, and the encrypted procedural instructions, and assemble an install-time procedural content file, the install-time procedural content file including at least the encrypted seed data, encrypted procedural instructions, and the one or more anti-tamper hashes.

At least one aspect of the above example may include where the instructions causes the at least one processor to exclude the encrypted generated content from the install-time procedural content file. At least one aspect of the above example may include where the instructions causes the at least one processor to receive first and second procedural instructions, wherein the second procedural instructions are specific to a target device different from a target device of the first procedural instructions. At least one aspect of the above example may include where the procedural instructions operate on the seed data to generate content. At least one aspect of the above example may include where the execution of the one or more procedural instructions generates at least one of image data, audio data, and/or texture data. At least one aspect of the above example may include where the instructions causes the at least one processor to transmit the install-time procedural content file to a gaming console.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A system for generating content for an encrypted package, the system comprising:
   at least one processor; and
   at least one memory including instructions which when executed by the at least one processor, cause the at least one processor to:
   receive a package including one or more anti-tamper hash portions and encrypted data, the encrypted data including one or more procedural content generation instructions,
   decrypt a portion of the encrypted data including the one or more procedural content generation instructions,
   generate data based on the execution of the one or more procedural content generation instructions and a corpus of data,
   encrypt the data generated based on the execution of the one or more procedural content generation instructions and the corpus of data, and
   validate the generated data utilizing one or more anti-tamper hashes from the anti-tamper hash portion of the package.

2. The system of claim 1, wherein the instructions that validate the generated data utilizing one or more anti-tamper hashes from the anti-tamper hash portion of the package include:
   generating a hash value based on an encrypted portion of the generated data;
   receiving a hash value from the anti-tamper hash portion of the package; and comparing the generated hash value to the received hash value.

3. The system of claim 2, wherein the instructions cause the at least one processor to acquire external data based on the execution of the one or more procedural instructions and the corpus of data from another device if the generated hash value does not match the received hash value.

4. The system of claim 2, wherein the instructions cause the at least one processor to acquire a package including one or more anti-tamper hash portions and encrypted data from another device when the generated hash value does not match the received hash value, the encrypted data including second generated data.

5. The system of claim 1, wherein the instructions cause the at least one processor to validate the received package prior to decrypting the encrypted data including the corpus of data and the one or more procedural content generation instructions.

6. The system of claim 1, wherein the execution of the one or more procedural content generation instructions generates at least one of image data, audio data, and/or texture data.

7. The system of claim 1, wherein the instructions cause the at least one processor to decrypt the encrypted data in an operating system different from an operating system that generates data based on the execution of the one or more procedural content generation instructions.

8. The system of claim 1, wherein the instructions cause the at least one processor to reserve storage space based on a metadata portion in the received package.

9. A method of generating content for an encrypted package comprising:
receiving a package including one or more anti-tamper hash portions and encrypted data, the encrypted data including one or more seed portions and one or more procedural content generation instructions;
decrypting a portion of the encrypted data including the one or more procedural content generation instructions and the one or more seed portions;
generating data based on the execution of the one or more procedural content generation instructions, wherein the one or more procedural content generation instructions operate on the one or more seed portions;
encrypting the generated data; and
validating the generated data utilizing one or more anti-tamper hashes from the anti-tamper hash portion of the package.

10. The method of claim 9, further comprising:
generating a hash value based on an encrypted portion of the generated data;
receiving a hash value from the anti-tamper hash portion of the package; and
comparing the generated hash value to the received hash value.

11. The method of claim 10, further comprising acquiring external data based on the execution of the one or more procedural content generation instructions and the corpus of data from a device different from which the hash value is generated if the generated hash value does not match the received hash value.

12. The method of claim 10, further comprising acquiring a package including one or more anti-tamper hash portions and encrypted data from a device different from which the hash value is generated if the generated hash value does not match the received hash value.

13. The method of claim 9, further comprising generating at least one of image data, audio data, and/or texture data.

14. The method of claim 9, further comprising decrypting the encrypted data in an operating system different from an operating system that generates data based on the execution of the one or more procedural content generation instructions.

15. A system for generating install-time procedural content for encrypted packages, the system comprising:
at least one processor; and
at least one memory including instructions which when executed by the at least one processor, cause the at least one processor to:
receive seed data and procedural content generation instructions,
execute the procedural content generation instructions to generate content based on the seed data,
encrypt the generated content, the seed data, and the procedural content generation instructions,
generate one or more anti-tamper hashes based on the encrypted content, encrypted seed data, and the encrypted procedural content generation instructions,
assemble an install-time procedural content file, the install-time procedural content file including at least the encrypted seed data, encrypted procedural content generation instructions, and the one or more anti-tamper hashes, and
transmit the install-time procedural content file to a client device.

16. The system of claim 15, wherein the instructions cause the at least one processor to exclude the encrypted generated content from the install-time procedural content file.

17. The system of claim 15, wherein the instructions cause the at least one processor to receive first and second procedural content generation instructions, wherein the second procedural content generation instructions are specific to a target device different from a target device of the first procedural content generation instructions.

18. The system of claim 15, wherein the procedural content generation instructions operate on the seed data to generate content.

19. The system of claim 15, wherein the execution of the one or more procedural content generation instructions generates at least one of image data, audio data, and/or texture data.

20. The system of claim 15, wherein the client device is a gaming console.

* * * * *